(12) United States Patent
Otsuki

(10) Patent No.: US 11,105,667 B2
(45) Date of Patent: Aug. 31, 2021

(54) HIGH AND LOW FLOW RATE MEASUREMENT DEVICE AND METHOD HAVING A FLOW RATE CORRECTION FOR OVERLAPPING FLOW RANGES

(71) Applicant: HORIBA, LTD., Kyoto (JP)

(72) Inventor: Yoshinori Otsuki, Kyoto (JP)

(73) Assignee: HORIBA, LTD., Kyoto (JP)

( * ) Notice: Subject to any disclaimer, the term of this patent is extended or adjusted under 35 U.S.C. 154(b) by 105 days.

(21) Appl. No.: 16/564,495

(22) Filed: Sep. 9, 2019

(65) Prior Publication Data

US 2020/0103265 A1 Apr. 2, 2020

(30) Foreign Application Priority Data

Oct. 2, 2018 (JP) .............................. JP2018-187071

(51) Int. Cl.
*G01F 1/34* (2006.01)
*G01F 1/72* (2006.01)
(52) U.S. Cl.
CPC . *G01F 1/72* (2013.01); *G01F 1/34* (2013.01)
(58) Field of Classification Search
None
See application file for complete search history.

(56) References Cited

U.S. PATENT DOCUMENTS

| 3,559,480 A | 2/1971 | Barber et al. |
| 3,664,357 A * | 5/1972 | Kreiss ................. G01M 3/2807 137/2 |
| 5,230,245 A | 7/1993 | Kamiunten et al. |
| 6,446,503 B1 | 9/2002 | Nukui et al. |
| 2003/0167836 A1 * | 9/2003 | Mattar ...................... G01F 1/68 73/197 |
| 2008/0150750 A1 * | 6/2008 | Parris ...................... G07F 15/10 340/870.02 |
| 2012/0055263 A1 * | 3/2012 | Konzelmann ............. G01F 1/66 73/861.18 |

FOREIGN PATENT DOCUMENTS

| EP | 3333550 A1 | 6/2018 |
| JP | 2018-096737 A | 6/2018 |
| JP | 2018096737 A | 6/2018 |

OTHER PUBLICATIONS

EESR dated Feb. 27, 2020 for European Patent Application No. 19 186 976.7, 7 pgs.

* cited by examiner

*Primary Examiner* — Harshad R Patel
(74) *Attorney, Agent, or Firm* — Brooks Kushman P.C.

(57) ABSTRACT

The present invention accurately measures flow rates that have a high peak flow rate caused by pulsation, and is provided with a first flow rate converter having a first measurement range and a first response speed, a second flow rate converter having a second measurement range that is narrower on a low flow rate side than the first measurement range and has a second response speed that is slower than the first response speed, and a flow rate calculation unit that, when a flow rate contained in the second measurement range is measured, calculates the flow rate by correcting outputs from the first flow rate converter using outputs from the second flow rate converter.

8 Claims, 4 Drawing Sheets

HIGH AND LOW FLOW RATE MEASUREMENT DEVICE AND METHOD HAVING A FLOW RATE CORRECTION FOR OVERLAPPING FLOW RANGES

CROSS-REFERENCE TO RELATED APPLICATION

This application claims priority to Japanese Application No. 2018-187071, filed Oct. 2, 2018, the disclosure of which is incorporated in its entirety by reference herein.

TECHNICAL FIELD

The present invention relates to a flow rate measurement device and a flow rate measurement method.

TECHNICAL BACKGROUND

Conventionally, in differential pressure flow meters such as Pitot tube flow meters, Venturi flow meters, laminar flow meters, and orifice flow meters, one method that might be considered in order to increase the dynamic range (i.e., the measurement range) is to provide a flow meter having a different measurement range.

As is shown, for example, in Patent Document 1, a method of increasing the dynamic range by providing a flow meter having a measurement range that corresponds to a high flow rate, together with a flow meter having a measurement range that corresponds to a low flow rate has been considered.

DOCUMENTS OF THE PRIOR ART

Patent Documents

[Patent document 1] Japanese Unexamined Patent Application Laid-Open (JP-A) No. 2018-96737

DISCLOSURE OF THE INVENTION

Problems to be Solved by the Invention

In cases in which a flow rate that has a high peak flow rate caused by pulsation in spite of the fact that the average flow rate thereof is low, such as, for example, an exhaust gas flow rate, is being measured, then if a structure in which, as is described above, there are simply provided a plurality of flow meters having mutually different measurement ranges is used, because of the effects of drift generated by temperature changes and the like in the flow meter on the high flow rate side, it is difficult to improve the measurement accuracy.

Therefore, the present invention was conceived in order to solve the above-described problems, and it is a principal object thereof to make it possible to accurately measure flow rates that have a high peak flow rate caused by pulsation.

Means for Solving the Problem

In other words, a flow rate measurement device according to the present invention is provided with a first flow rate converter having a first measurement range and a first response speed, a second flow rate converter having a second measurement range that is narrower on a low flow rate side than the first measurement range and has a second response speed, and a flow rate calculation unit that, when a flow rate contained in the second measurement range is measured using the first flow rate converter and the second flow rate converter simultaneously, calculates the flow rate by correcting outputs from the first flow rate converter using outputs from the second flow rate converter.

According to the above-described flow rate measurement device, by correcting outputs from a first flow rate converter using a flow rate of a second flow rate converter that has a narrower measurement range on the low flow rate side than the first flow rate converter, it is possible to perform offset correction of the first flow rate converter, and to reduce measurement errors made by the first flow rate converter in the second measurement range. As a result, it is possible to accurately measure flow rates whose peak flow rate is high because of pulsation. In addition, it is possible to calculate a flow rate by correcting outputs from the first flow rate converter in real time. Furthermore, because a flow rate can be measured using the first flow rate converter and the second flow rate converter simultaneously, switching shocks such as discontinuous changes in the flow rate that occur when a switch is made between two flow rate converters are eliminated, and a flow rate can be accurately measured.

In order to perform offset correction more simply and accurately, it is desirable that the second response speed be slower than the first response speed.

In order to accurately correct outputs from the first flow rate converter, it is desirable that the flow rate calculation unit correct outputs from the first flow rate converter such that outputs from the second flow rate converter match an average value of outputs from the first flow rate converter.

When the average value of the flow rates calculated by the flow rate calculation unit is further to the high flow rate side than the second measurement range, the measurement accuracy of the second flow rate converter deteriorates. Because of this, it is difficult for outputs from the second flow rate converter that have not been modified to be used. Consequently, it is desirable that, in a flow rate measurement in which the calculated average value of the flow rates (i.e., the average flow rate) is further to the high flow rate side than the second measurement range, the flow rate calculation unit calculate the flow rate using outputs from the first flow rate converter.

Moreover, it is desirable that, in a flow rate measurement in which the calculated average value of the flow rates is further to the high flow rate side than the second measurement range, the flow rate calculation unit correct outputs from the first flow rate converter using a predetermined fixed value. Here, either a predetermined value, or the most recent output from the second flow rate converter in the second measurement range may be used as the predetermined fixed value.

In a flow rate measurement device, it is conceivable that the first flow rate converter and the second flow rate converter are both differential pressure gauges.

In this case, it is desirable that there be additionally provided air release valves that are disposed on the second flow path on an upstream side and a downstream side of the second flow rate converter, and that the flow rate calculation unit correct drift in the second flow rate converter by opening the air release valves.

By employing this type of structure, it is possible to correct drift in the second flow rate converter. For example, in conditions in which the average value of the flow rates calculated by the flow rate calculation unit is further to the high flow rate side than the second measurement range, and measurement is only possible using the first flow rate converter, the second flow rate converter can be corrected by opening the air release valves.

In addition, in a flow rate measurement method according to the present invention, a first flow rate converter having a first measurement range and a first response speed, and a second flow rate converter having a second measurement range that is narrower on a low flow rate side than the first measurement range and has a second response speed that is slower than the first response speed are provided on a flow path, and when a flow rate contained in the second measurement range is measured, the flow rate is calculated by correcting outputs from the first flow rate converter using outputs from the second flow rate converter.

Effects of the Invention

According to the above-described present invention, by using a first flow rate converter and a second flow rate converter that each have mutually different measurement ranges and response speeds, it possible to accurately measure flow rates that have a high peak flow rate caused by pulsation.

BEST EMBODIMENTS FOR IMPLEMENTING THE INVENTION

Hereinafter, a flow rate measurement device according to an embodiment of the present invention will be described with reference to the drawings.

[Device Structure]

A flow rate measurement device 100 of the present embodiment measures flow rates of exhaust gas emitted, for example, from an internal combustion engine, and is used together with an exhaust gas analyzer that analyzes components contained in the exhaust gas.

Figure 1:
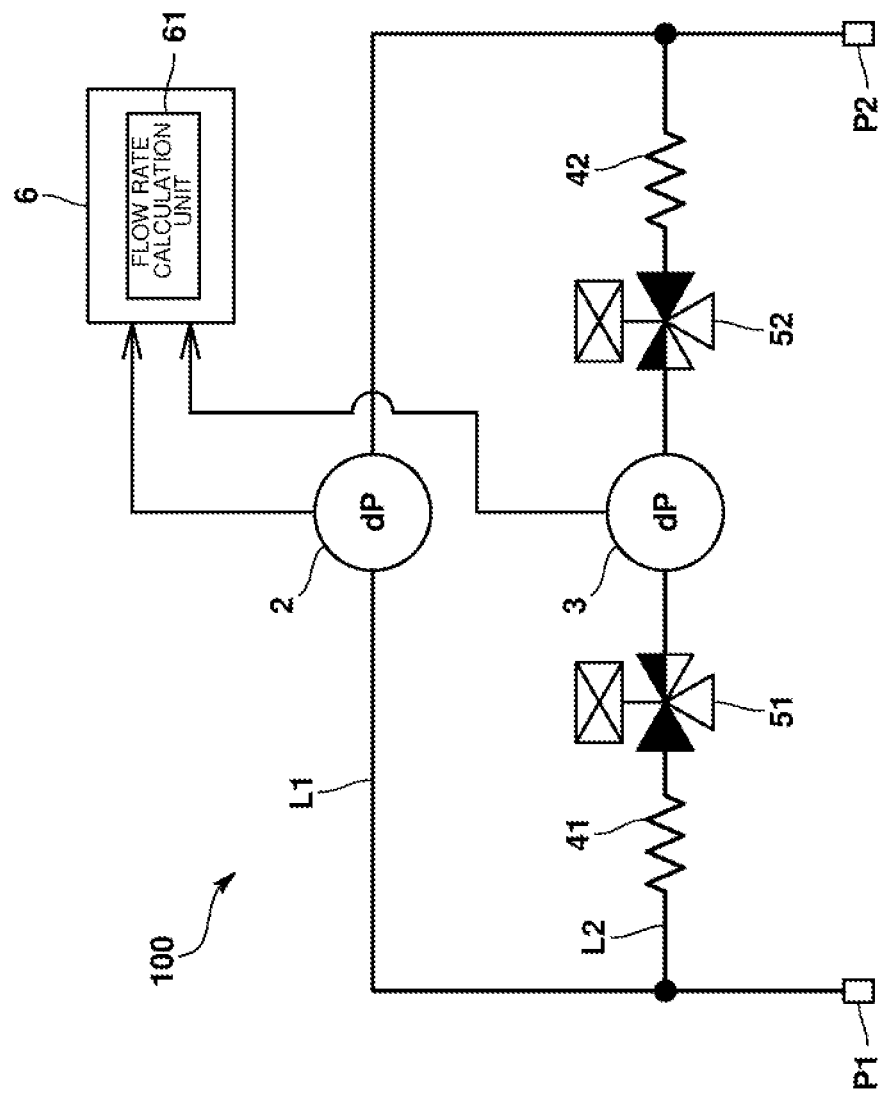
FIG. 1 is a view schematically showing a structure of a flow rate measurement device according to an embodiment of the present invention.

More specifically, this flow rate measurement device 100 uses, for example, a differential pressure flow meter such as a Pitot tube flow meter and, as is shown in FIG. 1, is provided with a first flow path L1 that has connecting ports P1 and P2 that are connected to a flow path along which a gas such as exhaust gas is flowing, a first flow rate converter 2 that is provided on the first flow path L1, a second flow path L2 that is connected to the first flow path L1 so as to bypass the first flow rate converter 2, a second flow rate converter 3 that is provided on the second flow path L2, and a calculation device 6 that performs predetermined calculations after acquiring outputs from the first flow rate converter 2 and the second flow rate converter 3. Note that one of the connecting ports P1 and P2 is connected to one of a static pressure side or a dynamic pressure side of the Pitot tube, while the other of the connecting ports P1 and P2 is connected to the other one of the static pressure side or the dynamic pressure side of the Pitot tube.

Figure 2:
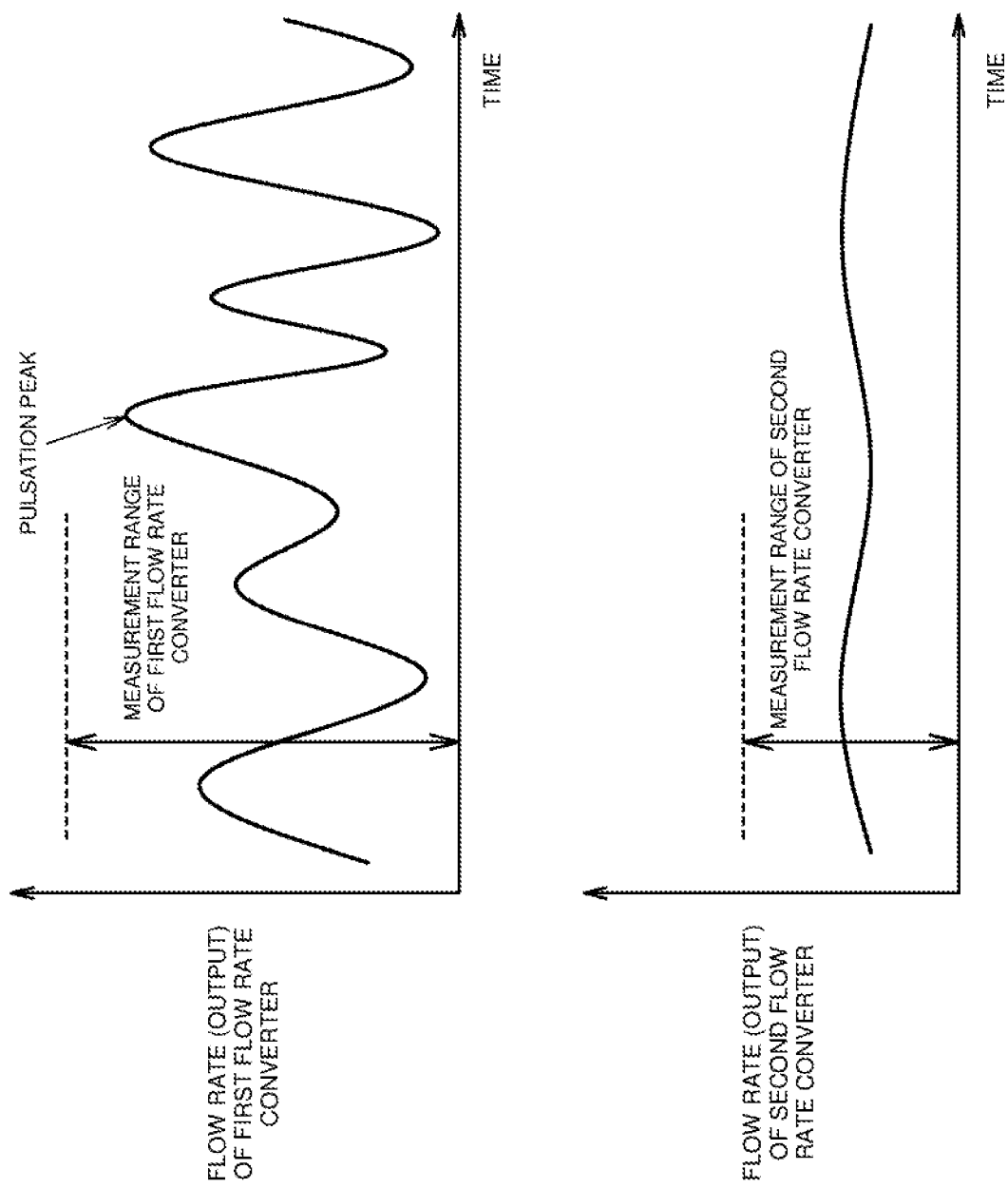
FIG. 2 is a schematic view of a flow rate calculated using outputs from each flow rate converter of the same embodiment.

The first flow rate converter 2 is a differential pressure gauge, and outputs a differential pressure in accordance with a flow rate. As is shown in FIG. 2, the first flow rate converter 2 has a first measurement range in which it is possible to measure a peak flow rate caused by pulsation of the exhaust gas flowing along the first flow path L1, and has a first response speed that can be measured by following the pulsation of the exhaust gas.

The second flow rate converter 3 is a differential pressure gauge, and outputs a differential pressure in accordance with a flow rate. As is shown in FIG. 2, the second flow rate converter 3 has a second measurement range that is on the low flow rate side of the first measurement range, and has a second response speed that is slower than the first response speed. Because the second flow rate converter 3 has a slower response speed than the first flow rate converter 2, the second flow rate converter 3 measures an average flow rate in which pulsation of the exhaust gas is reduced.

Capillaries 41 and 42, which are pulsation reducing mechanisms that are used to reduce pulsation of the exhaust gas are provided on an upstream side and a downstream side of the second flow rate converter 3. On the second flow path L2, an air release valve 51 is provided between the upstream-side capillary 41 and the second flow rate converter 3, and an air release valve 52 is provided between the downstream-side capillary 42 and the second flow rate converter 3. Note that the pulsation reducing mechanisms are not essential structure and may be omitted.

The calculation device 6 has a function of calculating a flow rate by correcting outputs from the first flow rate converter 2 in real time using outputs from the second flow rate converter 3.

More specifically, the calculation device 6 is provided with a flow rate calculation unit 61 that, when measuring a flow rate contained in the second measurement range using the first flow rate converter 2 and the second flow rate converter 3 simultaneously calculates the flow rate by correcting outputs from the first flow rate converter 2 using the output from the second flow rate converter 3.

Figure 3:
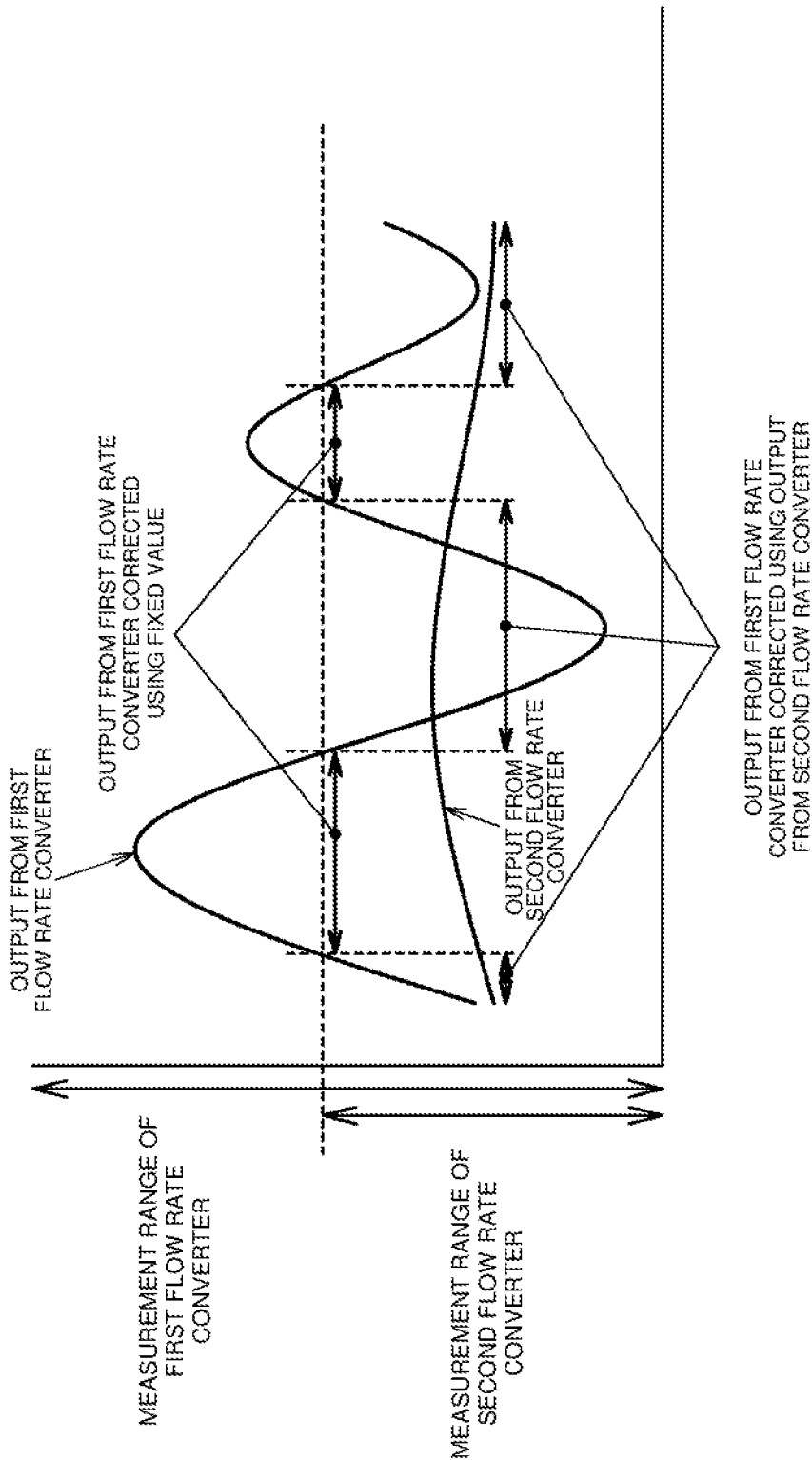
FIG. 3 is a schematic view showing a correction of an output from a first flow rate converter of the same embodiment.

As is shown in FIG. 3, when measuring a flow rate contained in the second measurement range, the flow rate calculation unit 61 performs offset correction in real time on outputs from the first flow rate converter 2 such that the output from the second flow rate converter 3 matches an average value of the outputs from the first flow rate converter 2.

The following example will now be described as a specific example of this offset correction.

If a response time of the first flow rate converter 2 is taken as t1, and a response time of the second flow rate converter 3 is taken as t2, then t1<t2. At this time, if the number of outputs from the second flow rate converter 3 is taken as 1, then the number of outputs from the first flow rate converter 2 is taken as $1\times(t2/t1)$. The flow rate calculation unit 61 then determines the average value of the $1\times(t2/t1)$ number of outputs from the first flow rate converter 2, and then determines a difference between this average value and the output from the second flow rate converter 3. This difference is taken as an offset amount. The flow rate calculation unit 61 then corrects the outputs from the first flow rate converter 2 by subtracting the offset amount from these outputs. In addition to this, it is also possible for the flow rate calculation unit 61 to take the number of outputs from the second flow rate converter 3 as n, and to take the number of outputs from the first flow rate converter 2 as $n\times(t2/t1)$. The flow rate calculation unit 61 may then calculate an offset amount from the average value of the n number of outputs from the second flow rate converter 3, and the average value of the n×(t2/t1) number of outputs from the first flow rate converter 2, and may then correct the outputs from the first flow rate converter 2 by subtracting the offset amount from these outputs.

Note that, when measuring a flow rate contained in the second measurement range, instead of calculating the average value for the first flow rate converter 2, it is possible for the flow rate calculation unit 61 to perform the correction by simply subtracting the output from the second flow rate converter 3 from the outputs from the first flow rate converter 2.

In addition, in a flow rate measurement in which the calculated average value of the flow rates is further to the high flow rate side than the second measurement range, the flow rate calculation unit 61 calculates the flow rate by correcting the outputs from the first flow rate converter 2 using a predetermined fixed value. Note that, in FIG. 3, instantaneous values are shown in order to simplify the explanation. The flow rate calculation unit 61 of the present embodiment uses as the predetermined fixed value the most recent output from the second flow rate converter 3 that is within the second measurement range. In addition to this, it is also possible for the flow rate calculation unit 61 to calculate the flow rate by correcting the outputs from the first flow rate converter 2 using a previously set fixed value.

Moreover, because the differential pressure of the second flow rate converter 3 is changed to zero as a result of the flow rate calculation unit 61 opening the air release valves 51 and 52 that are provided on the second flow path L2, any drift of the second flow rate converter 3 is corrected by this action. The timing for performing this correction is when the following conditions are met. For example, in a flow rate measurement in which the calculated average value of the flow rates is further to the high flow rate side than the second measurement range, and when the measurement can be made using only the first flow rate converter 2. Note that the air release valves 51 and 52 are not essential structure and may be omitted.

Effects of the Present Embodiment

According to the flow rate measurement device 100 of the present embodiment, by correcting outputs from the first flow rate converter 2 using outputs from the second flow rate converter 3 whose measurement range is further to the low flow rate side than that of the first flow rate converter 2, and whose response speed is slower than that of the first flow rate converter 2, it is possible to perform offset correction of the first flow rate converter 2, and to reduce measurement errors made by the first flow rate converter 2 in the second measurement range. As a result, it is possible to accurately measure flow rates that have a high peak flow rate caused by pulsation. In addition, flow rates can be calculated by correcting outputs from the first flow rate converter 2 in real time.

Moreover, because the flow rate calculation unit 61 corrects outputs from the first flow rate converter 2 using predetermined fixed values even in a flow rate measurement in which the average value of the flow rates calculated by the flow rate calculation unit 61 is further to the high flow rate side than the second measurement range, it is possible to reduce measurement errors made by the first flow rate converter 2 when the calculated average value of the flow rates is further to the high flow rate side than the second measurement range. Furthermore, because flow rates are measured using the first flow rate converter 2 and the second flow rate converter 3 simultaneously, switching shocks such as discontinuous changes in the flow rate that occur when a switch is made between two flow rate converters are eliminated, and a flow rate can be accurately measured.

Additional Variant Embodiments

Note that the present invention is not limited to the above-described embodiment.

For example, differential pressure flow meters, which are differential pressure gauges, are used for the flow rate converters of the above-described embodiment, however, it is also possible for various other types of flow meter such as electromagnetic flow meters, ultrasonic flow meters, vortex flow meters. Coriolis flow meters, volumetric flow meters, area flow meters, and thermal flow meters to be used instead of these.

Figure 4:
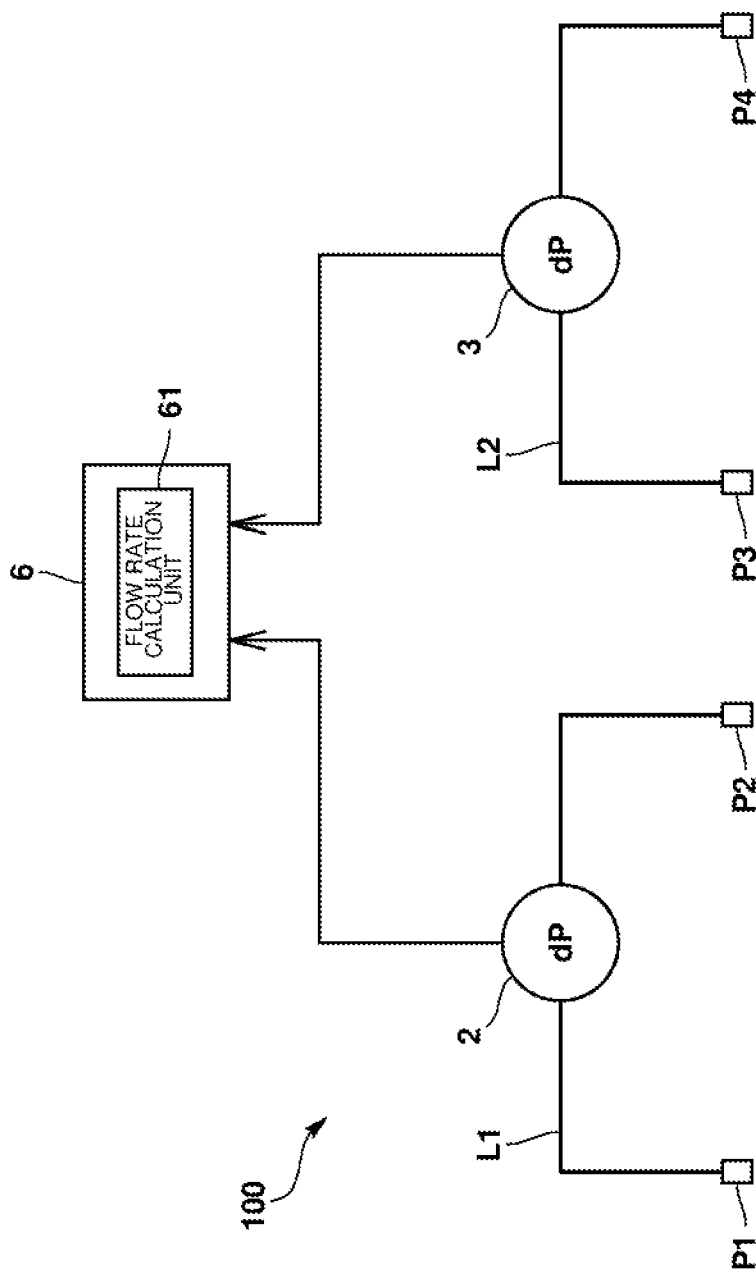
FIG. 4 is a view schematically showing a structure of a flow rate measurement device according to a variant embodiment of the present invention.

Additionally, in the above-described embodiment, a structure is employed in which the second flow path L2 is connected to the first flow path L1 which has the connecting portions P1 and P2, however, as is shown in FIG. 4, it is possible for the first flow path L1, which has the connecting ports P1 and P2, and the second flow path L2, which has connecting ports P3 and P4, to be connected together in series. In this case as well, the first flow rate converter 2 is provided on the first flow path L1, and the second flow rate converter 3 is provided on the second flow path L2. Additionally, the calculation device 6 calculates a flow rate by correcting outputs from the first flow rate converter 2 in real time using outputs from the second flow rate converter 3.

The flow rate calculation unit of the above-described embodiment firstly corrects outputs from the first flow rate converter using outputs from the second flow rate converter, and then calculates a flow rate using the corrected outputs, however, it is also possible for a first flow rate to be determined from outputs from the first flow rate converter, and for a second flow rate to be determined from outputs from the second flow rate converter, and for the first flow rate to be corrected using the second flow rate.

Moreover, the second response speed of the second flow rate converter of the above-described embodiment is slower than the first response speed of the first flow rate converter, however, it is also possible for the second response speed to be the same as the first response speed, or to be faster than the first response speed. In this case, it is conceivable that, for example, the number of outputs from which the average value of the first flow rate converter is determined will be greater than the number of outputs from which the average value of the second flow rate converter is determined.

Moreover, in the above-described embodiment, the present invention is used to measure the flow rate of a gas such as exhaust gas, however, it is also possible for the present invention to be used to measure the flow rate of a fluid.

Furthermore, it is also possible for a buffer tank or the like to be used instead of a capillary as the pulsation reducing mechanism provided on the second flow path.

Furthermore, it should be understood that the present invention is not limited to the above-described embodiment, and that various modifications and the like may be made thereto insofar as they do not depart from the spirit or scope of the present invention.

DESCRIPTION OF THE REFERENCE NUMERALS

100 . . . Flow Rate Measurement Device
L1 . . . First Flow Path

2 . . . First Flow Rate Converter
L2 . . . Second Flow Path
3 . . . Second Flow Rate Converter
51, 52 . . . Air Release Valves
6 . . . Calculation Device
61 . . . Flow Rate Calculation Unit

What is claimed is:

1. A flow rate measurement device comprising:
   a first flow rate converter having a first measurement range and a first response speed;
   a second flow rate converter having a second measurement range that is narrower on a low flow rate side than the first measurement range and has a second response speed slower than the first response speed; and
   a flow rate calculation unit that, when a flow rate contained in the second measurement range is measured using the first flow rate converter and the second flow rate converter simultaneously, calculates the flow rate by correcting outputs from the first flow rate converter using outputs from the second flow rate converter.

2. The flow rate measurement device according to claim 1, wherein the flow rate calculation unit corrects outputs from the first flow rate converter such that outputs from the second flow rate converter match an average value of outputs from the first flow rate converter.

3. The flow rate measurement device according to claim 1, wherein in a flow rate measurement in which a calculated average value of the flow rates is further to a high flow rate side than the second measurement range, the flow rate calculation unit calculates the flow rate using outputs from the first flow rate converter.

4. The flow rate measurement device according to claim 1, wherein in a flow rate measurement in which a calculated average value of the flow rates is further to a high flow rate side than the second measurement range, the flow rate calculation unit corrects outputs from the first flow rate converter using a predetermined fixed value.

5. The flow rate measurement device according to claim 1, wherein the first flow rate converter and the second flow rate converter are differential pressure gauges.

6. The flow rate measurement device according to claim 5, wherein there are further provided air release valves that are disposed on an upstream side and a downstream side of the second flow rate converter, and
   the flow rate calculation unit corrects drift in the second flow rate converter by opening the air release valves.

7. A flow rate measurement method in which a first flow rate converter having a first measurement range and a first response speed, and a second flow rate converter having a second measurement range that is narrower on a low flow rate side than the first measurement range and has a second response speed, which is slower than the first response speed, are provided on a flow path, and,
   when a flow rate contained in the second measurement range is measured using the first flow rate converter and the second flow rate converter simultaneously, the flow rate is calculated by correcting outputs from the first flow rate converter using outputs from the second flow rate converter.

8. A flow rate measurement device comprising:
   a first flow rate converter having a first measurement range and a first response speed;
   a second flow rate converter having a second measurement range that is narrower on a low flow rate side than the first measurement range and has a second response speed;
   a flow rate calculation unit that, when a flow rate contained in the second measurement range is measured using the first flow rate converter and the second flow rate converter simultaneously, calculates the flow rate by correcting outputs from the first flow rate converter using outputs from the second flow rate converter; and
   air release valves which are disposed on an upstream side and a downstream side of the second flow rate converter, wherein
   the first flow rate converter and the second flow rate converter are differential pressure gauges, and
   the flow rate calculation unit corrects drift in the second flow rate converter by opening the air release valves.

* * * * *